United States Patent
Asher et al.

(10) Patent No.: US 10,182,532 B1
(45) Date of Patent: Jan. 22, 2019

(54) DECORATIVE GARDEN BARRIER

(71) Applicants: Dana Asher, Mansfield, TX (US); Raymond A. Asher, Mansfield, TX (US)

(72) Inventors: Dana Asher, Mansfield, TX (US); Raymond A. Asher, Mansfield, TX (US)

( * ) Notice: Subject to any disclaimer, the term of this patent is extended or adjusted under 35 U.S.C. 154(b) by 279 days.

(21) Appl. No.: 14/873,317

(22) Filed: Oct. 2, 2015

Related U.S. Application Data

(60) Provisional application No. 62/058,772, filed on Oct. 2, 2014.

(51) Int. Cl.
*A01G 9/28* (2018.01)

(52) U.S. Cl.
CPC ...................... *A01G 9/28* (2018.02)

(58) Field of Classification Search
CPC ........................................................ A01G 1/08
See application file for complete search history.

(56) References Cited

U.S. PATENT DOCUMENTS

| | | | |
|---|---|---|---|
| 2,821,809 A | 5/1956 | Collier et al. | |
| 5,230,187 A * | 7/1993 | Reimann | A01G 1/08 248/156 |
| 5,263,279 A * | 11/1993 | Delsanne | A01G 9/124 248/530 |
| 5,453,916 A * | 9/1995 | Tennis | E01F 9/669 362/152 |
| 5,720,128 A | 2/1998 | Smith et al. | |
| 6,293,046 B1 | 9/2001 | Meglino et al. | |
| 6,449,897 B1 | 9/2002 | Gaston | |
| 6,719,276 B1 | 4/2004 | Bush | |
| 7,322,714 B2 * | 1/2008 | Barnett | A01G 1/08 362/152 |
| 7,526,892 B2 * | 5/2009 | Saunders | A01G 1/08 47/33 |
| 8,322,087 B1 | 12/2012 | Loscano | |
| 8,354,048 B2 | 1/2013 | Caceres et al. | |
| 9,578,812 B2 * | 2/2017 | Moita | A01G 1/08 |
| 2006/0150480 A1 | 7/2006 | Ruller | |
| 2008/0053005 A1 | 3/2008 | Wilson et al. | |
| 2009/0064571 A1 * | 3/2009 | Fakhari | A01G 1/08 47/33 |
| 2009/0086471 A1 | 4/2009 | Bollman | |

OTHER PUBLICATIONS

"Guard-n-edge" at least Apr. 2010 (Year: 2010).*

* cited by examiner

*Primary Examiner* — Jessica B Wong
(74) *Attorney, Agent, or Firm* — Kenneth L Tolar

(57) ABSTRACT

A garden barrier includes a panel having a front wall and a rear wall with a receptacle formed therebetween for receiving existing garden edging. The front wall is configured to resemble stone, brick, wood or any other desired material that is used in decorative landscaping borders. Accordingly, one or more panels can be used to conceal existing lawn edging while simultaneously forming a decorative landscaping barrier.

13 Claims, 4 Drawing Sheets

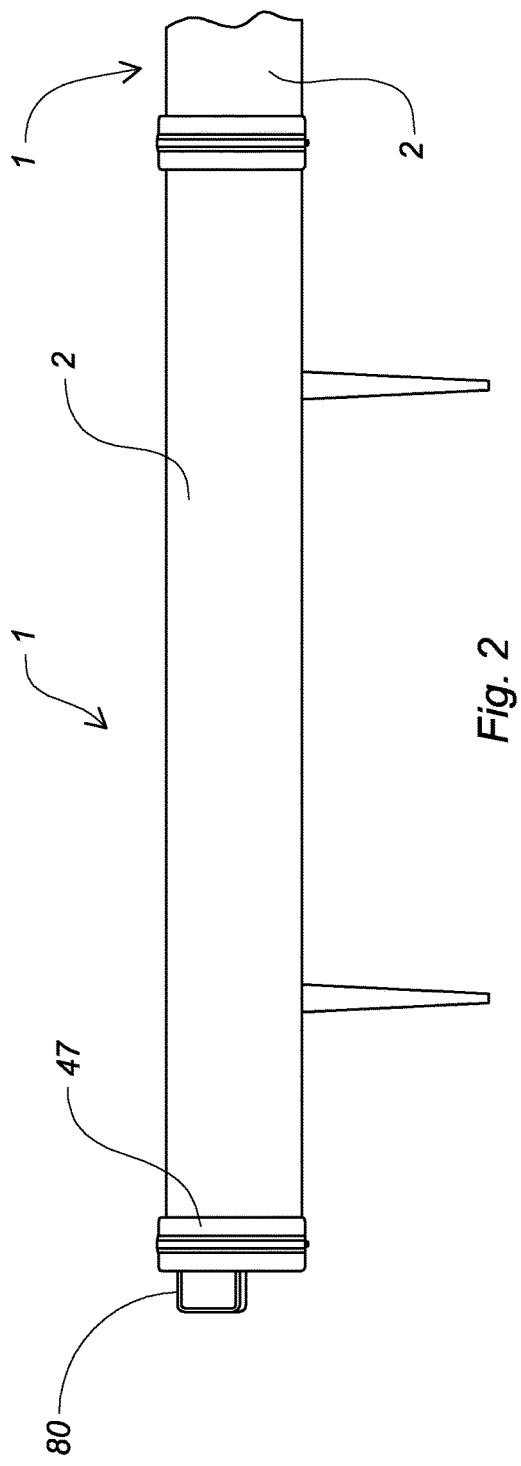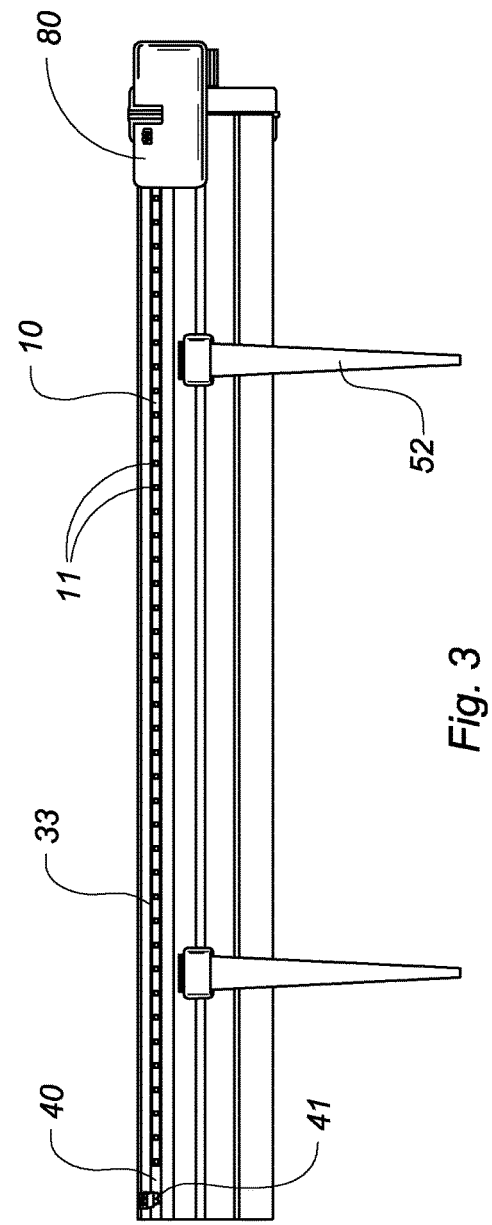

DECORATIVE GARDEN BARRIER

CROSS REFERENCE TO RELATED APPLICATIONS

This application is entitled to the benefit of provisional patent application No. 62/058,772 filed on Oct. 2, 2014, the specification of which is incorporated herein by reference.

BACKGROUND OF THE INVENTION

The present invention relates to a barrier that decoratively conceals unsightly garden edging.

DESCRIPTION OF THE PRIOR ART

Garden edging is typically anchored or staked to the ground to form a border between a lawn and a flower bed. Because metal edging rusts and corrodes, it quickly becomes an eyesore that must be discarded and replaced. Furthermore, metal edging has sharp surfaces that can injure a pet or a child.

Accordingly, there is currently a need for a device that aesthetically conceals unsightly garden edging. A review of the prior art reveals a myriad of garden borders and edging. For example, U.S. published patent application no. 2008/0053005 to Wilson et al. discloses a cover for a conventional landscape divider including a tapered casing with an internal slot for firmly receiving the sharp, upper edge of landscape edging to minimize injuries.

U.S. Pat. No. 2,821,809 issued to Collier discloses metal edging formed of multiple segments that are attachable to other segments to form edging having a desired length.

U.S. Pat. No. 5,720,128 issued to Smith et al. discloses lawn edging including a plurality of vertical, interconnecting strips that are inserted into a lawn, each having a horizontal plate extending from a rear surface that limits the insertion depth of the strips.

U.S. Pat. No. 6,293,046 issued to Meglino discloses landscape edging comprising a plurality of interconnecting border sections having attachable covers that conceal a seam formed between adjacent, interconnected sections.

U.S. Pat. No. 6,449,897 issued to Gaston discloses landscape edging comprising elongated, interconnecting panels, each having a tubular rail at an upper edge. A plurality of blocks include tubular recesses on a lower surface for receiving the rails.

U.S. Pat. No. 6,719,276 issued to Bush discloses a decorative fence cover.

U.S. Pat. No. 8,322,087 issued to Loscano discloses a modular landscape border system including curb sections for receiving electrical wiring or plumbing, and planter sections for housing vegetation.

U.S. Pat. No. 8,354,048 issued to Caceres et al. discloses roll-up, fiberglass lawn edging that is configured to resemble brick, stone or wood.

U.S. published patent application no. 2006/0150480 issued to Ruller discloses landscape edging including telescoping strips that are configured to connect to other similar strips.

U.S. published patent application no. 2009/0086471 to Bollman discloses an illuminated landscape module for attaching a light strand to existing edging.

As indicated above, although the patent to Wilson discloses a cover for concealing the sharp, upper edge of conventional, metallic edging, the cover is a plastic strip that is unsightly and aesthetically mundane. Furthermore, the cover is anchored with stakes that must each be placed within a designated, preformed slot that does not allow the stake to be selectively positioned.

The present invention provides an improved edging cover having an outer surface that is configured to resemble brick, stone, wood or any other decorative landscaping border. Furthermore, the cover has longitudinally slidable anchors for more easily securing the cover along circular or irregular paths where fixed anchors may be ineffective. Finally, the cover includes an integral lighting system having a detachable cover that protects coupled electrical connectors when two or more strips are interconnected.

SUMMARY OF THE INVENTION

The present invention relates to a garden barrier comprising a panel having a front wall and a rear wall with a receptacle formed therebetween for receiving existing garden edging. The front wall is configured to resemble stone, brick, wood or any other desired material that is used in decorative landscaping borders. Accordingly, one or more panels can be used to conceal existing lawn edging while simultaneously forming a decorative landscaping barrier.

It is therefore an object of the present invention to provide a garden barrier that easily fits over existing garden edging.

It is another object of the present invention to provide a decorative garden barrier that resembles stone, brick or wood.

Other objects, features, and advantages of the present invention will become readily apparent from the following detailed description of the preferred embodiment when considered with the attached drawings and the appended claims.

BRIEF DESCRIPTION OF THE DRAWINGS

FIG. 2 is an isolated, front view of an exemplary panel connected to a second panel.

FIG. 3 is a rear view of an exemplary panel.

DESCRIPTION OF THE PREFERRED EMBODIMENT

Figure 1:
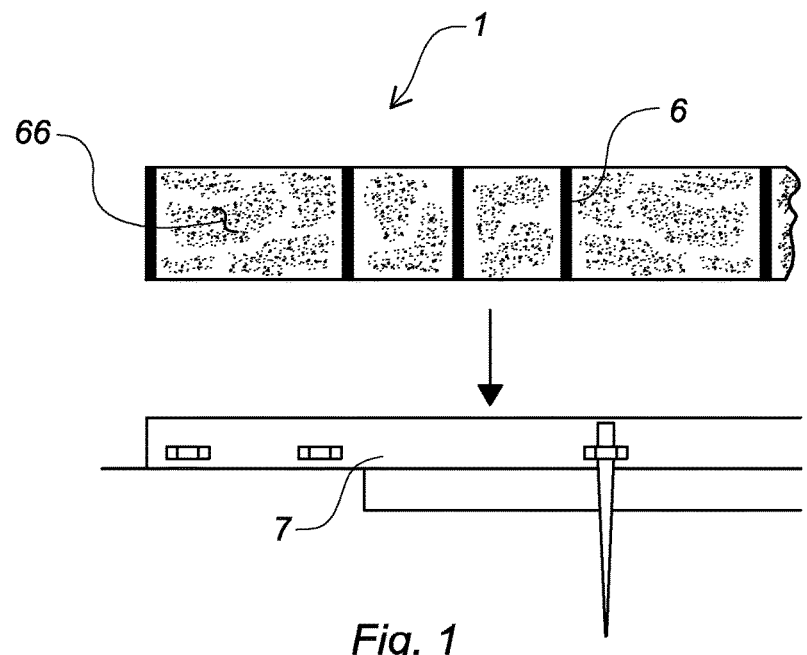
FIG. 1 is a front, exploded view of an exemplary panel and existing garden edging.
Figure 4:
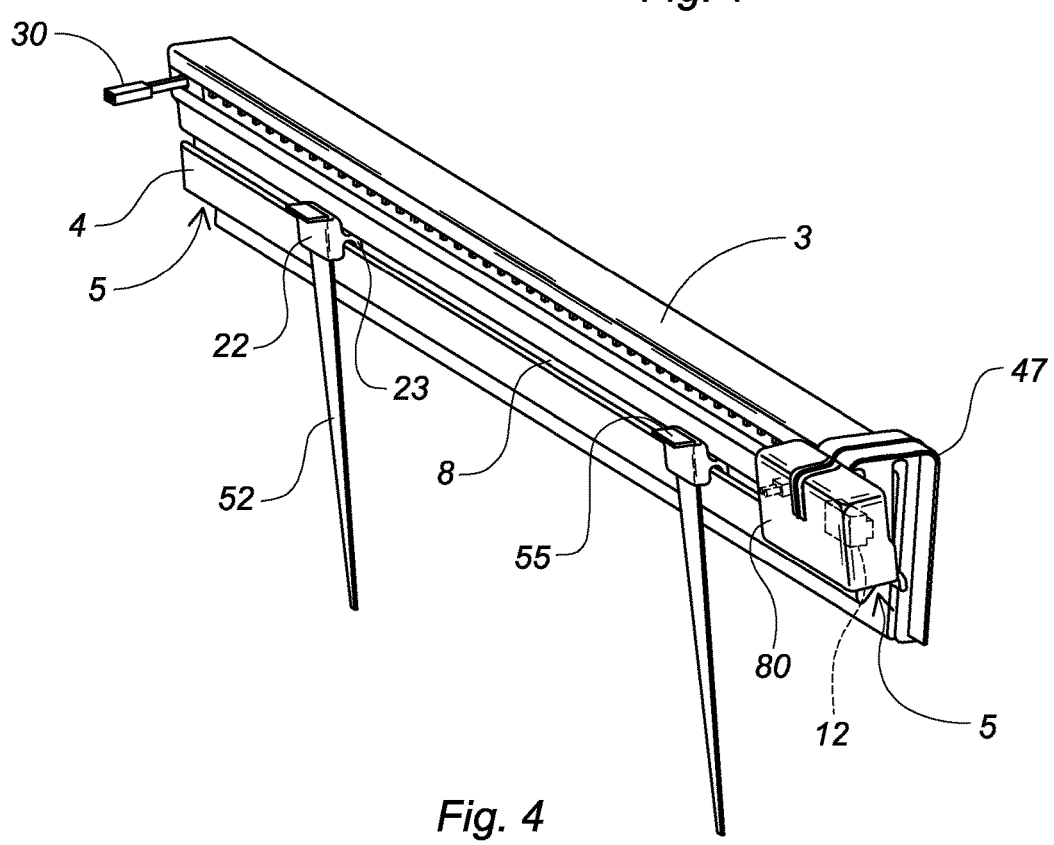
FIG. 4 is a perspective view of the panel of FIGS. 1-3.
Figure 5:
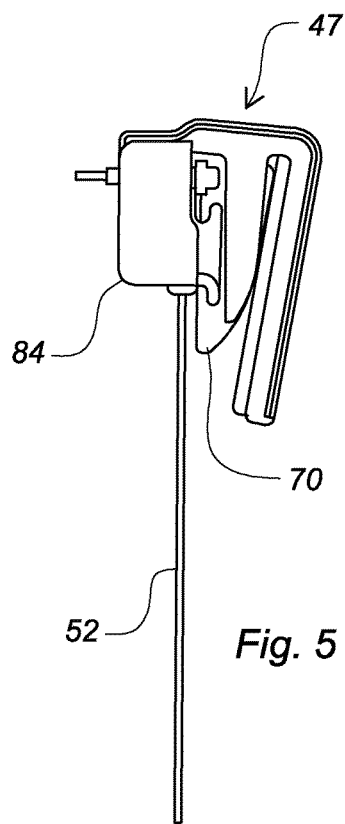
FIG. 5 is an end view of the panel of FIG. 4.
Figure 6:
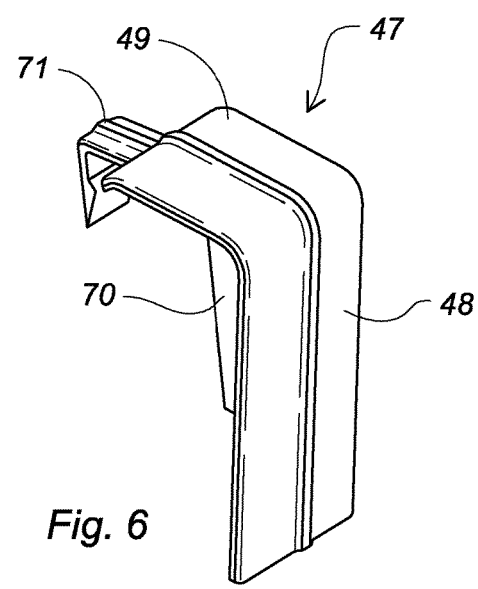
FIG. 6 is an isolated, perspective view of the joint clip.
Figure 7:
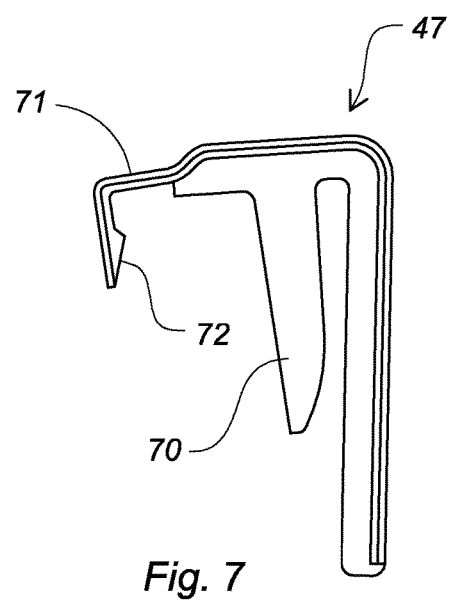
FIG. 7 is a side view of the joint clip.
Figure 8:
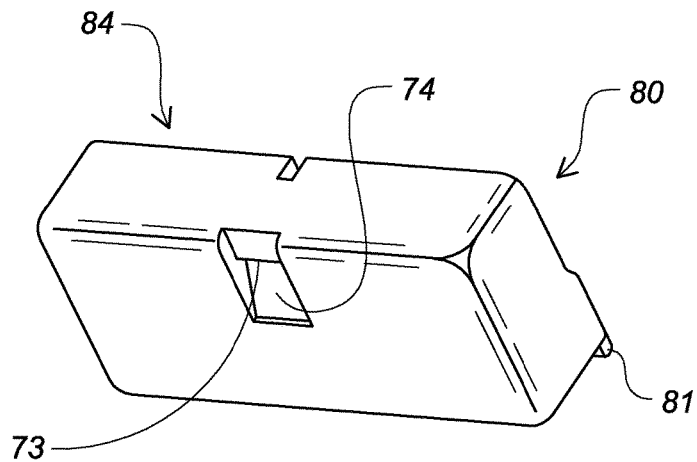
FIG. 8 is an isolated, perspective view of the cover.
Figure 9:
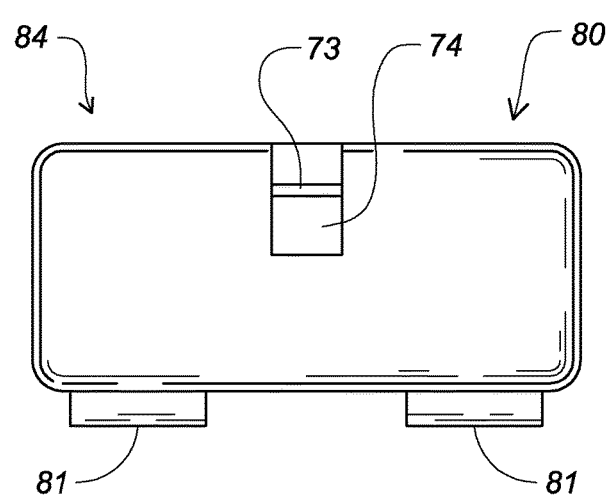
FIG. 9 is a front, plan view of the cover.
Figure 10:
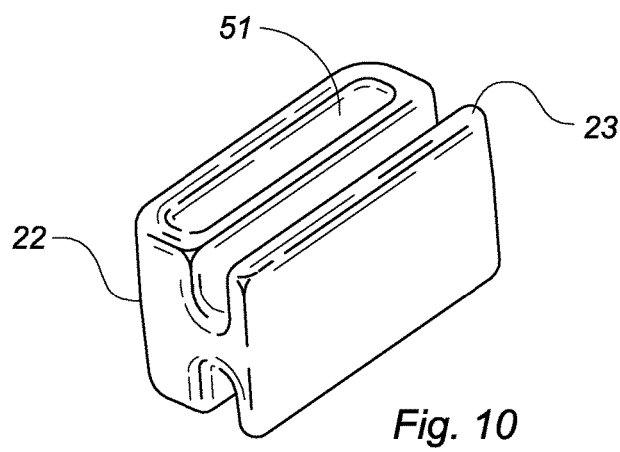
FIG. 10 is an isolated, perspective view of an anchor bracket.

The present invention relates to a decorative garden barrier comprising one or more interconnecting, elongated panels 1, each having a front wall 2, a top wall 3 and a rear wall 4 that is spaced from the front wall to form a receptacle 5 therebetween. The front wall is configured to resemble stone, brick, wood or any other desired material that is used in decorative landscaping borders. For example, in FIG. 1, the front wall includes a faux fieldstone texture 66 with intermittent, faux grout lines 6. The receptacle is dimensioned to firmly receive conventional, preexisting garden edging 7 while the rear wall is shorter than the front wall to assure that the lower edge of the decorative front wall rests on the ground.

On the rear wall is a longitudinal, horizontal channel 8 that extends from one end of the panel to an opposing end. One or more stakes include a bracket 22 at an upper end having a T-shaped protrusion 23 that is slidably received within the channel 8 for anchoring the panel to underlying soil. The stakes can be easily slid to a desired position to more effectively anchor the panel along a circular or irregular path. An elongated blade 52 passing through a slot 51 on the bracket 22 has a horizontal flange 55 at an upper end to allow a user to easily press the anchor into soil with a hand or foot.

Above the channel 8 is a longitudinal strip 10 of LEDs 11 for illuminating adjacent vegetation. The strip is aligned with an elongated opening 33 on the panel rear wall, or is positioned behind a transparent or translucent cover to readily project light from the panel. The strip includes an electrical plug 12 at a first end and a mating receptacle 30 at an opposing end for electrically connecting the LEDs on adjacent, joined panels. Thus, each end of the panel includes a fitting 40 with a central aperture 41 through which electrical wiring passes from the plug or receptacle to the LEDs.

A power source is coupled with the plug or receptacle on a free end of a panel to power the LEDs. The power source can be a rechargeable battery or a power cord with an AC to DC converter for coupling with a nearby wall receptacle. Alternatively, the power source could include one or more solar panels mounted on a support structure that continuously replenishes a rechargeable battery. A photosensor may be also be used to activate the LEDs only in darkness to conserve battery power.

A cover 84 is attachable to the panel to protect a coupled plug 12 and receptacle 30 from impact damage. The cover includes a hollow, box-shaped enclosure 80 having a pair of tabs 81 depending from a lower surface for removably seating within the channel 8. Accordingly, one of the tabs is positioned within one of the channels on each of two joined adjacent panels, and the cover 84 is placed against the rear wall to enclose the plug and receptacle.

Two adjacent panels are further connected with a substantially L-shaped joint clip 47 having a vertical front leg 48 and a horizontal upper arm 49 with a thin divider 70 depending therefrom that is positioned between two contiguous, abutting ends of a pair of panels. A latch 71 having a tooth 72 on an inner surface firmly grips a ledge 73 within a recess 74 to secure both the protective cover and the joined panels.

Accordingly, a pair of panels can be interconnected by joining two ends, coupling the LED plug on one panel with the mating receptacle on the other and superimposing the cover thereon. Each tab is inserted into the channel on one of the panels and the joint clip is attached to the interface between the two panels by fastening the latch to the indented ledge on the cover. The interconnected panels will conceal existing lawn edging while simultaneously forming a decorative landscaping barrier that can illuminate adjacent vegetation.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A garden barrier for decoratively concealing lawn edging, said lawn edging formed of a planar strip having an upper edge, said garden barrier comprising:
    a first barrier member having a front wall configured to resemble a decorative landscape border, a top wall and a rear wall that is spaced from the front wall to form a receptacle therebetween, said receptacle dimensioned to firmly receive said planar strip;
    at least one stake slidably mounted on the rear wall of said first barrier member for anchoring said first barrier member to underlying soil, wherein said stake includes a bracket at an upper end having a T-shaped protrusion that is slidably received within a longitudinal channel on the rear wall of said first barrier member for selectively repositioning said stake when anchoring said first barrier member along an irregular path.

2. The garden barrier according to claim 1 wherein the front wall of said first barrier member is configured to resemble either of stone, brick and wood.

3. The garden barrier according to claim 1 wherein the rear wall of said first barrier member is shorter than the front wall to assure that a lower edge of the front wall rests on underlying soil.

4. The garden barrier according to claim 1 further comprising a longitudinal strip of LEDs on the rear wall of said first barrier member for illuminating adjacent vegetation.

5. The garden barrier according to claim 4 further comprising:
    a second barrier member having a front wall configured to resemble a decorative landscape border, a top wall and a rear wall that is spaced from the front wall to form a receptacle therebetween, said receptacle dimensioned to firmly receive said planar strip.

6. The garden barrier according to claim 5 further comprising a longitudinal strip of LEDs on the rear wall of said second barrier member for illuminating adjacent vegetation.

7. The garden barrier according to claim 6 further comprising means for electrically connecting the longitudinal strip of LEDs on said first barrier member to the strip of LEDs on the second barrier member.

8. The garden barrier according to claim 7 wherein said means for electrically connecting the strip of LEDs on said first barrier member to the strip of LEDs on the second barrier member comprises:
    a plug connected to the strip of LEDs on the first barrier member;
    a mating receptacle on the strip of LEDs on the second barrier member.

9. The garden barrier according to claim 8 further comprising a cover attachable to the rear wall of said first barrier member and the rear wall of said second barrier member to conceal and protect said plug and said mating receptacle and to join said first barrier member with said second barrier member.

10. The garden barrier according to claim 9 further comprising a joint clip attachable to said cover for securely joining said cover, said first barrier member and said second barrier member.

11. The garden barrier according to claim 10 wherein said joint clip comprises:
    a vertical front leg and a horizontal upper arm with a divider depending therefrom, said divider positioned between two contiguous abutting ends of the first barrier member and the second barrier member;
    a latch extending from said upper arm, said latch having a tooth that releasably grips a ledge positioned within a recess on said cover to securely join the cover, the first barrier member and the second barrier member.

12. The garden barrier according to claim 9 wherein said cover includes a hollow, box-shaped enclosure having a pair of tabs depending from a lower surface for removably seating within the channel.

13. A garden barrier for decoratively concealing lawn edging, said lawn edging formed of a planar strip having an upper edge, said garden barrier comprising:
   a first barrier member having a front wall configured to resemble a decorative landscape border, a top wall and a rear wall that is spaced from the front wall to form a receptacle therebetween, said receptacle dimensioned to firmly receive said planar strip;
   a longitudinal strip of LEDs on the rear wall of said first barrier member for illuminating adjacent vegetation;
   a second barrier member having a front wall configured to resemble a decorative landscape border, a top wall and a rear wall that is spaced from the front wall to form a receptacle therebetween, said receptacle dimensioned to firmly receive said planar strip;
   a longitudinal strip of LEDs on the rear wall of said second barrier member for illuminating adjacent vegetation;
   means for electrically connecting the strip of LEDs on said first barrier member to the strip of LEDs on the second barrier member, wherein said means comprises a plug connected to the strip of LEDs on the first barrier member and a mating receptacle on the strip of LEDs on the second barrier member;
   a cover attachable to the rear wall of said first barrier member and the rear wall of said second barrier member to conceal and protect said plug and said mating receptacle and to join said first barrier member with said second barrier member;
   a joint clip attachable to said cover for securely joining said cover, said first barrier member and said second barrier member, wherein said joint clip comprises a vertical front leg and a horizontal upper arm with a divider depending therefrom, said divider positioned between two contiguous abutting ends of the first barrier member and the second barrier member and a latch extending from said upper arm, said latch having a tooth that releasably grips a ledge positioned within a recess on said cover to securely join the cover, the first barrier member and the second barrier member.

* * * * *